United States Patent [19]

Gerke et al.

[11] Patent Number: 5,009,384
[45] Date of Patent: Apr. 23, 1991

[54] OVERHEAD SUPPORT SYSTEM FOR TV MONITORS

[75] Inventors: David B. Gerke; Michael MacDonald, both of Calgary, Canada

[73] Assignee: Inter-Link Communciations Inc., Calgary, Canada

[21] Appl. No.: 545,602

[22] Filed: Jun. 29, 1990

[51] Int. Cl.⁵ ............................................. B42F 13/00
[52] U.S. Cl. ..................................... 248/343; 248/317; 361/427; 439/928
[58] Field of Search ................. 248/317, 223.4, 224.1, 248/224.2, 225.1, 551, 553, 613, 323, 324, 342, 343, 917; 361/390, 417, 426, 427; 439/928, 533, 374

[56] References Cited

U.S. PATENT DOCUMENTS

| | | | |
|---|---|---|---|
| 3,348,116 | 10/1967 | Freeman | 439/928 X |
| 3,353,068 | 11/1967 | Turk | 361/427 X |
| 3,836,945 | 9/1974 | Kinoshita | 439/928 X |
| 4,310,136 | 1/1982 | Mooney | 248/278 |
| 4,338,626 | 7/1982 | Lemelson | 358/101 X |
| 4,498,123 | 2/1985 | Fuss | 361/427 |
| 4,566,663 | 1/1986 | Barchus | 248/324 |
| 4,581,495 | 4/1986 | Geri | 439/928 X |
| 4,714,230 | 12/1987 | Huang | 248/343 X |
| 4,756,528 | 7/1988 | Umashankar | 108/28 X |
| 4,760,497 | 7/1988 | Roston | 439/534 X |
| 4,836,478 | 6/1989 | Sweere | 248/279 |

Primary Examiner—J. Franklin Foss
Attorney, Agent, or Firm—Berman, Aisenberg & Platt

[57] ABSTRACT

An overhead support system for TV monitors comprising a shoe releasably and slidably insertable into seated position into a pocket in an upper portion of the monitor housing. The shoe carries electrical contacts to mateably engage with corresponding electrical contacts for the monitor when in seated position. Conductor cables are embedded in the shoe and extend from the electrical contacts through a pipe, one end of which is secured to the shoe and the other end of which passes through shock absorbing material supported on an overhead support frame to threadably engage an anchor means supported on the shock absorbing material. This system securely supports such monitors in overhead locations such as on buses.

11 Claims, 1 Drawing Sheet 5,009,384

OVERHEAD SUPPORT SYSTEM FOR TV MONITORS

BACKGROUND OF THE INvENTION

The present invention relates to an overhead support system for TV monitors, and more particularly relates to such a support system which is particularly well-suited to support TV monitors for viewing by passengers in motor homes and buses, trains, boats, school buses and other forms of public transit. Such a system is described and illustrated in my co-pending Application Ser. No. 07/545604 filed June 29, 1990 entitled "Passenger Entertainment System for Coaches".

Of general background as describing and illustrating suspension systems for TV monitors are U.S. Pat. No. 4,836,478 issued June 6, 1989 of Sweere (requiring a pair of tracks on which a support frame for the TV monitor can ride), U.S. Pat. No. 4,338,626 of Weinblatt issued May 17, 1983 relating to a frame designed to sit over the backrest of the front seat of a car so that the rear seat passenger can see a television; Gombroff U.S. Design Pat. No. 245,051 issued July 19, 1978 and Boscacci U.S. Pat. No. 270,689 issued Sept. 27, 1983, illustrating tray-type supports for TV monitors. As well, U.S. Pat. No. 4,756,528 of Omashankar issued July 12, 1988 describes and illustrates a TV monitor which is supported in the back of a typical coach passenger seat.

None of these constructions are particularly suitable for mounting TV monitors in vehicles such as buses where only a few monitors may be required to provide viewing for all of the passengers in the bus, and where such TV monitors, to be visible, must be suspended from a relatively high position within the bus. As well, because of the bumpy movement of the vehicle, it is important that the TV monitor be firmly secured in position so that it does not become loose and vibrate relative to the bus thereby interfering with the operation and viewing of the monitor. Many of the conventional systems for supporting monitors in buses and the like require major modifications to the bus whereby the monitor is virtually permanently secured to the bus frame to prevent its vibration.

It is an object of the present invention to provide an easily installed but secure system for overhead support of TV monitors in buses and the like. It is a further object of the present invention to provide such a system which is effective in minimizing vibration during movement of the vehicle which might otherwise interfere with the operation and viewing of the TV monitor.

SUMMARY OF THE INVENTION

In accordance with the present invention there is provided an overhead support system for TV monitors for use on buses and the like, comprising a shoe which carries cable means for the TV monitor. The cable means are electrically associated with an electrical contact means exposed on an outer surface of the shoe. The shoe has sides provided with a guide and support means positioned to mateably slide in cooperating guide and support means in the upper part of a TV monitor housing, into seated position with the shoe electrical contact means electrically engaging corresponding electrical contact means on the TV monitor housing. A support in the form of a pipe is secured at one end to and upwardly extends from the shoe. The shoe cable means extends through the pipe. The pipe is to extend through an aperture in an overhead support frame. A shock absorbing means is supported on the overhead support frame and also has an aperture through which the pipe is to extend. An anchor sits on the shock absorbing means and releasably engages the other end of the pipe to hold the shoe firmly in position on the overhead support frame.

In a preferred embodiment the shoe is provided with a lock mechanism to cooperate with a lock mechanism on the TV monitor housing to releasably secure the shoe in seated position with respect to the TV monitor housing and prevent disengagement of the TV monitor from the shoe when the lock mechanism is in locked position.

The invention also relates to a TV monitor in combination with this type of overhead support system. The TV monitor has a housing which is modified, with respect to a conventional TV monitor housing, by having a pocket in its upper portion to releasably receive the shoe. The pocket has a guide and support to cooperate with those of the shoe and an end with electrical contact means to electrically engage the electrical contact means on the shoe when the shoe is in seated position in the pocket.

The overhead support system in accordance with the present invention is relatively easy to install for example on the overhead luggage rack of a bus. The shoe and pipe arrangement provides a system which can effectively support a TV monitor in position for easy viewing by passengers on a bus or the like, with significantly reduced vibration of the monitor even during movement of the bus. When the shoe is in seated position in the TV monitor housing, it may be readily locked in place to prevent theft of the monitor.

The system according to the present invention further facilitates the installation and removal of a TV monitor on a bus or the like, by providing, as a built-in element of the support system itself, proper wiring for the TV monitor so that when the shoe is in position in the TV monitor housing, the monitor is effectively plugged in and ready to operate.

BRIEF DESCRIPTION OF THE DRAWINGS

These and other objects and advantages of the invention will become apparent upon reading the following detailed description and upon referring to the drawings in which.

Figure 1:
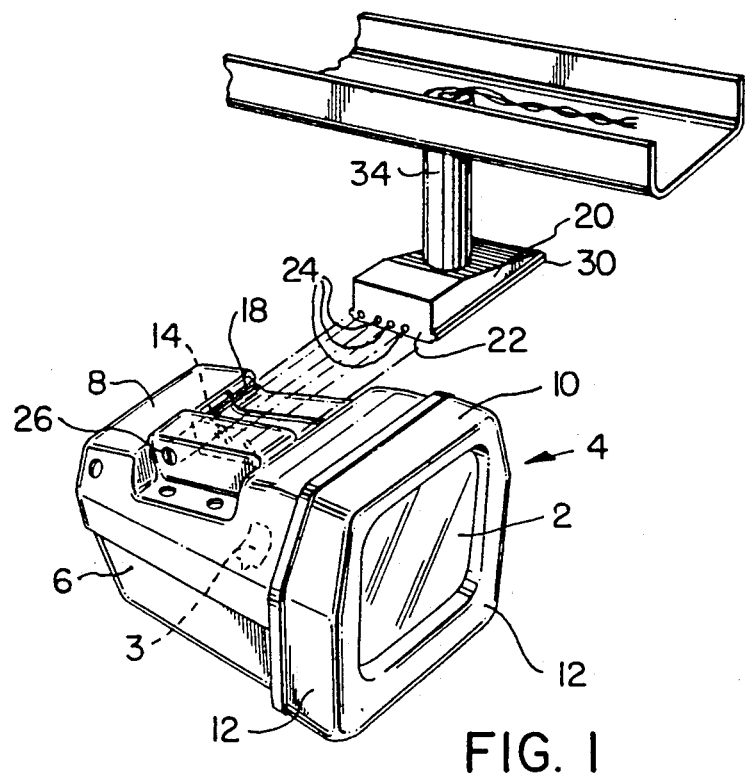
FIG. 1 is a perspective view of a part of the overhead support system and a TV monitor in accordance with the present invention in position on a bus.

While the invention will be described in conjunction with an example embodiment, it will be understood that it is not intended to limit the invention to such an embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated an overhead support system and TV monitor for use in buses and the like in accordance with the present invention. Considering first the monitor, and referring to FIG. 1, to minimize head injuries as a result of passengers coming in contact with monitor 2 and to minimize vandalism, monitors 2, which are conventional TV monitors modified to have internal D.C.—D.C. H.V. converters 3 so that they will operate on D.C. current from the bus' battery, are encased in a wraparound, moulded plastic housing 4 as illustrated. The housing is moulded of three pieces, 6, 8 and 10, with front piece 10 having its lower section 12 of a soft, resilient, more rubbery consistency. No controls are normally exposed to avoid vandalism and the like since the monitors are essentially mounted in a public environment. Monitor 2 is wired so that its electrical contacts 14 are at top, at the side of a pocket or depression 16 having side support and guide tracks 18 extending along opposite sides for guiding and receiving the sides of a support shoe 20. At end 22 of shoe 20 are mating electrical contacts 24 for monitor contacts 14, so that one set of contacts may be plugged into the other when shoe 20 is properly seated in shoe receiving pocket 16. As well, a key operated lock means 26 is associated with monitor housing 4 and cooperates with shoe 20 in a conventional manner so that monitor 2 may be locked in position on shoe 20 to prevent its unwanted removal. Lock means 26 may be of any conventional construction.

Shoe 20 is formed from a moulded polymer, with electrical contacts 24 and square brackets 30 (which slide in guide tracks 18) moulded into it on external surfaces. Also embedded in shoe 20 is one end of pipe 34. Cable means in the form of wires 35 extend from contacts 24 of shoe 20, through that shoe and up through pipe 34 to other parts of the monitor's power and control system (not illustrated).

Figure 2:
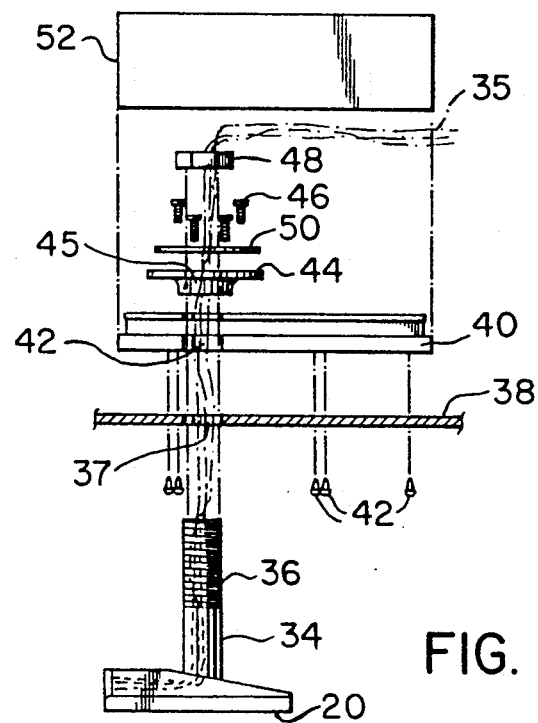
FIG. 2 is an exploded side schematic view of a monitor and monitor support system in accordance with FIG. 1.

As can be seen in FIG. 2, the upper end of pipe 34 is provided with threads 36. Pipe 34 is flushly received in aperture 37 through luggage rack 38 as illustrated, on which luggage rack 38 sits shock mount 40 which again is provided with an aperture 42 aligned with that through luggage rack 38 for passage of the upper end of pipe 34. Shock mount 40 is secured, for example by means of self-tapping screws 42, to luggage rack 38. Shock mount 40 is made of an appropriate resilient material such as rubber or the like. A flange 44 is bolted by means of bolts 46 to shock mount 40 and luggage rack 38, to hold shock mount 40 in position. Flange 44 has a central aperture to threadably receive the upper threaded end of pipe 34. A lock nut 48 is threaded to the upper end of pipe 34, with keyed washer 50 positioned between lock nut 48 and flange 44 as illustrated. Bolts 46 pass through keyed washer 50 as well as flange 44. These components form an excellent shock mount assembly for monitor 2 which ensure that monitor 2 is securely held in position, suspended downwardly from luggage rack 38. Cap 52 rests on rack 38 to cover the components of the support system extending through or resting on rod 38.

It will be understood from this description that the overhead support system in conjunction with the TV monitor according to the present invention achieves safety, necessary since the monitors are mounted overhead and might otherwise be prone to being hit by a passenger's head. As well, it is very difficult for monitors 2 to come loose and vibrate. Vandalism of the monitor, which is an important consideration in its construction since the monitors are essentially mounted in a public environment, is achieved by exposing no controls to the public.

Thus it is apparent that there has been provided in accordance with the invention an overhead support system for TV monitors for use on buses and the like that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An overhead support system for TV monitors for use on buses and the like comprising:
   (a) a shoe carrying cable means for the TV monitor, the cable means electrically associated with an electrical contact means exposed on an outer surface of the shoe, the shoe having sides provided with guide and support means positioned to mateably slide in cooperating guide and support means in the upper part of a TV monitor housing, into seated position with the shoe electrical contact means electrically engaging corresponding electrical contact means on the TV monitor housing;
   (b) support means in the form of a pipe secured at one end to and upwardly extending from the shoe, the shoe cable means extending through the pipe, the pipe to extend through an aperture in an overhead support frame;
   (c) shock absorbing means to be supported on the overhead support frame and having an aperture through which the pipe is to extend; and
   (d) anchor means to sit on the shock absorbing means and releasably engage the other end of the pipe to hold the shoe firmly in position on the overhead support frame.

2. A support system according to claim 1 wherein the shoe is further provided with a lock mechanism to cooperate with a lock mechanism on the TV monitor housing to releasably secure the shoe in seated position with respect to the TV monitor housing and prevent disengagement of the TV monitor from the shoe when the lock mechanism is in locked position.

3. A support system according to claim 1 wherein the contact means comprises a plate at a forward end of the shoe with a plurality of exposed electrical connectors appropriately electrically associated with conductors in the cable means.

4. A support system according to claim 3 wherein the guide and support means comprise a pair of parallel spaced linear brackets outwardly extending along opposite sides of the shoe to be received in spaced facing grooves in a shoe-receiving pocket in the top of the TV monitor housing.

5. A shoe according to claim 4 wherein the shoe has a housing made of sturdy moulded polymeric material in which the plate, brackets, cable means and pipe end have been embedded.

6. A support system according to claim 1 wherein said other end of the pipe is externally threaded and the anchor means comprises a lock nut to threadably engage the threaded end of the pipe.

7. A support system according to claim 6 wherein a flange with a circular threaded aperture is seated on the shock mount and secured to the overhead support frame when the system is in position, the threaded end of the pipe threadably engaging the flange aperture and the lock nut.

8. A TV monitor in combination with the overhead support system of claim 1, the TV monitor having a housing with a pocket in its upper portion to releasably receive the shoe in seated position, the pocket having guide and support means to cooperate with those of the shoe and an end with electrical contact means to electrically engage the electrical contact means on the shoe when the shoe is in seated position in the pocket.

9. A TV monitor in combination with the overhead support system of claim 4, the TV monitor having a housing with a pocket in its top, the pocket having spaced facing grooves to slidably and releasably receive the brackets of the shoe to guide the shoe into seated position and support the TV monitor thereon, the pocket further provided with an end with electrical contact means to electrically engage the electrical contact means on the shoe.

10. A TV monitor in combination with the overhead support system of claim 9, TV monitor housing being provided with a lock mechanism to cooperate with the shoe to releasably secure the shoe in seated position with respect to the TV monitor housing and prevent disengagement of the TV monitor from the shoe when the lock mechanism is in locked position.

11. A TV monitor in combination with an overhead support system according to claim 8 wherein the TV monitor has a lower, front portion of its housing made from resilient, rubber-like material.

* * * * *